(12) United States Patent
Engelen et al.

(10) Patent No.: US 10,113,714 B2
(45) Date of Patent: Oct. 30, 2018

(54) LIGHTING UNITS WITH REFLECTIVE ELEMENTS

(71) Applicant: PHILIPS LIGHTING HOLDING B.V., Eindhoven (NL)

(72) Inventors: Dirk Valentinus René Engelen, Heusden-Zolder (BE); Tim Dekker, Eindhoven (NL); Bartel Marinus Van De Sluis, Eindhoven (NL); Philip Steven Newton, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 59 days.

(21) Appl. No.: 15/301,593

(22) PCT Filed: Mar. 23, 2015

(86) PCT No.: PCT/IB2015/052094
§ 371 (c)(1),
(2) Date: Oct. 3, 2016

(87) PCT Pub. No.: WO2015/150963
PCT Pub. Date: Oct. 8, 2015

(65) Prior Publication Data
US 2017/0016597 A1    Jan. 19, 2017

Related U.S. Application Data

(60) Provisional application No. 61/974,045, filed on Apr. 2, 2014.

(51) Int. Cl.
*F21V 14/04* (2006.01)
*F21V 9/30* (2018.01)
(Continued)

(52) U.S. Cl.
CPC ............. *F21V 14/04* (2013.01); *F21K 9/61* (2016.08); *F21K 9/64* (2016.08); *F21S 6/002* (2013.01);
(Continued)

(58) Field of Classification Search
CPC .......... F21V 14/04; F21V 3/00; F21V 3/0481; F21V 7/0016; F21V 7/05; F21V 3/12;
(Continued)

(56) References Cited

U.S. PATENT DOCUMENTS 6,758,582 B1   7/2004 Hsiao et al.
2005/0052873 A1   3/2005 Sokolov
(Continued)

FOREIGN PATENT DOCUMENTS

CA       2687529 A1    8/2010
DE    202006012008 U1   1/2007
(Continued)

*Primary Examiner* — Bao Q Truong

(57) ABSTRACT

Apparatus and methods are described herein for lighting control. A lighting unit (100, 200, 300, 400, 500) may include a base (104, 204, 304, 404) adapted to be inserted into a socket (106, 206, 306) of a luminaire/lighting fixture. The lighting unit may include one or more light sources (108, 208, 308, 408, 508) to emit light at least in a first direction and one or more reflective elements (110, 210, 310, 410, 510, 610) arranged to define an aperture (112, 212, 312, 412, 512, 612) through which a first spatial portion (114, 214, 314, 414, 514) of the emitted light continues in the first direction, prevent a second spatial portion (116, 216, 316, 416, 516) of the emitted light from continuing in the first direction, and reflect at least part of the second spatial portion of the light in a second direction different than the first direction.

20 Claims, 6 Drawing Sheets

(51) Int. Cl.
 *F21V 3/12* (2018.01)
 *F21S 10/02* (2006.01)
 *F21S 6/00* (2006.01)
 *F21S 8/06* (2006.01)
 *F21S 10/00* (2006.01)
 *F21V 7/00* (2006.01)
 *F21V 7/05* (2006.01)
 *F21V 7/22* (2018.01)
 *F21V 11/10* (2006.01)
 *F21V 14/02* (2006.01)
 *F21V 19/02* (2006.01)
 *F21S 10/04* (2006.01)
 *F21K 9/61* (2016.01)
 *F21K 9/64* (2016.01)
 *F21S 8/04* (2006.01)
 *F21V 3/00* (2015.01)
 *F21V 23/00* (2015.01)
 *F21V 8/00* (2006.01)
 *F21W 121/00* (2006.01)
 *F21V 23/04* (2006.01)
 *F21Y 115/10* (2016.01)

(52) U.S. Cl.
 CPC . *F21S 8/04* (2013.01); *F21S 8/06* (2013.01); *F21S 10/007* (2013.01); *F21S 10/026* (2013.01); *F21S 10/043* (2013.01); *F21V 3/00* (2013.01); *F21V 3/12* (2018.02); *F21V 7/0016* (2013.01); *F21V 7/05* (2013.01); *F21V 7/22* (2013.01); *F21V 9/30* (2018.02); *F21V 11/10* (2013.01); *F21V 14/02* (2013.01); *F21V 19/02* (2013.01); *F21V 23/003* (2013.01); *F21V 23/0435* (2013.01); *G02B 6/0001* (2013.01); *F21V 23/045* (2013.01); *F21W 2121/00* (2013.01); *F21Y 2115/10* (2016.08)

(58) Field of Classification Search
 CPC ... F21V 9/30; F21V 7/22; F21V 11/10; F21V 14/02; F21V 19/02; F21V 23/003; F21V 23/0435; F21V 23/045; F21K 9/61; F21K 9/64; F21S 6/002; F21S 8/04; F21S 8/06; F21S 10/007; F21S 10/026; F21S 10/043; G02B 6/0001; F21Y 2115/10; F21W 2121/00

See application file for complete search history.

(56) References Cited

U.S. PATENT DOCUMENTS

| | | |
|---|---|---|
| 2009/0103293 A1 | 4/2009 | Harbers et al. |
| 2010/0141153 A1* | 6/2010 | Recker ............... H05B 33/0803 315/149 |
| 2012/0081880 A1* | 4/2012 | Narendran ................ F21V 9/16 362/84 |
| 2012/0273812 A1 | 11/2012 | Takahashi et al. |
| 2012/0313502 A1 | 12/2012 | Hu |
| 2013/0027904 A1 | 1/2013 | Fan |
| 2013/0039041 A1 | 2/2013 | Yeh et al. |
| 2013/0094215 A1* | 4/2013 | Jurik ..................... F21S 10/007 362/296.01 |
| 2014/0043820 A1 | 2/2014 | Ye et al. |
| 2014/0210333 A1* | 7/2014 | Kang .................... F21V 7/0016 313/46 |
| 2014/0241004 A1* | 8/2014 | Chen ...................... F21S 10/04 362/569 |

FOREIGN PATENT DOCUMENTS

| | | |
|---|---|---|
| EP | 2009479 A1 | 12/2008 |
| EP | 2565520 A1 | 6/2013 |
| WO | 2011156645 A1 | 12/2011 |
| WO | 2013011404 A2 | 1/2013 |
| WO | 2013036061 A1 | 3/2013 |
| WO | 2014147505 A1 | 9/2014 |

* cited by examiner

LIGHTING UNITS WITH REFLECTIVE ELEMENTS

CROSS-REFERENCE TO PRIOR APPLICATIONS

This application is the U.S. National Phase application under 35 U.S.C. § 371 of International Application No. PCT/IB2015/052094, filed on Mar. 23, 2015, which claims the benefit of U.S. patent application Ser. No. 61974,045, filed on Apr. 2, 2014. These applications are hereby incorporated by reference herein.

TECHNICAL FIELD

The present invention is directed generally to lighting control. More particularly, various inventive methods and apparatus disclosed herein relate to lighting units with one or more reflective elements configured to redirect at least a spatial portion of light emitted by one or more light sources.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects.

Some conventional luminaires cast light emitted by an installed lighting unit in various directions. For example, ceiling-mounted luminaires may cast light from an installed light bulb onto the ceiling, sometimes in addition to light cast downwards through a diffusing surface. In some cases, the luminaires include one or more optical elements, such as "gobos" (Goes Before OpticS) or collimators, that are configured to shape light emitted by an installed lighting unit into various projected patterns and shapes. Lighting units such as light bulbs, on the other hand, typically emit alight in nearly all directions and/or in a single direction that is not adjustable. Thus, there is a need in the art to provide a lighting unit that is configurable to emit light in multiple distinct directions.

SUMMARY

The present disclosure is directed to lighting units with one or more reflective elements configured to redirect at least a spatial portion of light emitted by one or more light sources. For example, a lighting unit may include one or more reflective elements arranged to direct at least a portion of light emitted by one or more light sources in a direction that is opposite or different from another direction in which a remainder of the light emitted by the one or more light sources travels. This may enable, for example, a lighting unit installed in a ceiling lighting socket to cast light downwards while also casting light upwards towards the ceiling.

Generally, in one aspect, the invention relates to a lighting unit that includes a base adapted to be inserted into a socket of a luminaire or lighting fixture; one or more light sources to emit light at least in a first direction; and one or more reflective elements. The one or more reflective elements may be arranged to: define an aperture through which a first spatial portion of the emitted light continues in the first direction; prevent a second spatial portion of the emitted light from continuing in the first direction; and reflect at least part of the second spatial portion of the light in a second direction that is different than the first direction.

In various embodiments, the one or more reflective elements are movable relative to the one or more light sources. In various embodiments, the one or more light sources are movable relative to the one or more reflective elements. In various versions, the lighting unit may include a controller configured to cause the one or more light sources to move in response to user input. In various versions, the controller may be configured to receive the user input over a wireless interface. In various versions, the one or more light sources may be movable along an axis that extends parallel to the first direction through the aperture to alter a size of the first spatial portion of the emitted light.

In various embodiments, the one or more reflective elements include a mirrored surface. In various embodiments, at least part of the one or more reflective elements is coated with a phosphor material selected to cause at least part of the second spatial portion of light to have a different color temperature than the first spatial portion of light. In various embodiments, the one or more reflective elements include a Lambertian surface. In various embodiments, the lighting unit includes a gobo mounted on the one or more reflective elements to permit a third spatial portion of the emitted light to pass through the one or more reflective elements.

In various embodiments, the lighting unit may include a light guide mounted over the aperture to receive the first spatial portion of the light. In various versions, the light guide is shaped to resemble a flame, and the lighting unit further comprises a controller configured to energize the one or more light sources in a manner selected to mimic a flickering flame.

In various embodiments, the one or more reflective elements includes a disk with a surface that faces the light sources, wherein the surface is at least partially reflective, wherein the aperture passes through the disk. In various versions, the lighting unit may include a transparent or translucent housing coupled to the base, and the disk may be mounted on a surface of the housing. In various versions, at least a portion of a surface of the housing is coated with phosphor material. In various versions, at least a portion of the surface of the housing between the surface of the disk and the one or more light sources is coated with phosphor material.

In various embodiments, the one or more reflective elements may include a plurality of reflective blades of a diaphragm shutter, wherein the plurality of reflective blades are configured to be slid over each other to alter a diameter of the aperture. In various embodiments, the diaphragm shutter may be controllable via user input received through a wireless interface.

In another aspect, the invention relates to a lighting unit that includes: a base adapted to be inserted into a socket of a luminaire or lighting fixture; one or more LEDs to emit light; a controller configured to selectively energize the one or more LEDs in response to user input; and a planar portion with an at least partially reflective surface that faces the light sources. The planar portion may define an aperture through which at least a first spatial portion of the emitted light emitted passes, while a second spatial portion of the emitted light is reflected off the first surface.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Some conventional luminaires cast light emitted by an installed lighting unit in various directions. In some cases, the luminaires include one or more reflective elements configured to shape light emitted by an installed lighting unit into various projected patterns and shapes. Lighting units such as light bulbs, on the other hand, typically emit light in nearly all directions and/or in a single direction that is not adjustable. Thus, there is a need in the art to provide a lighting unit that is configurable to emit light in multiple distinct directions. More generally, Applicants have recognized and appreciated that it would be beneficial to provide a lighting unit that, without the use of a luminaire, may project light in various forms in various directions. In view of the foregoing, various embodiments and implementations of the present invention are directed to lighting units with one or more reflective elements configured to redirect at least a spatial portion of light emitted by one or more light sources.

Figure 1:
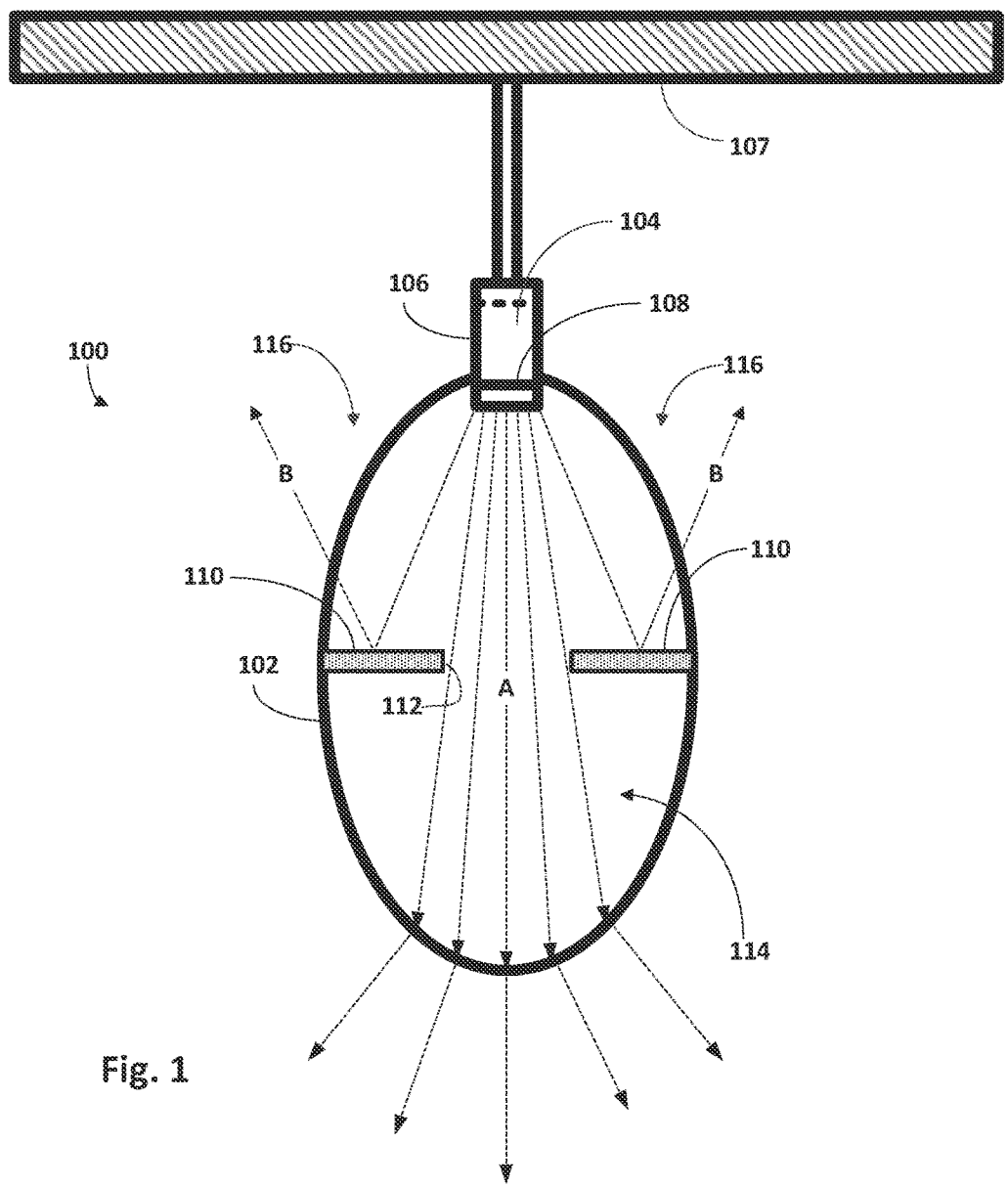
FIG. 1 illustrates one embodiment of a lighting unit configured with selected aspects of the present disclosure, in accordance with various embodiments.

Referring to FIG. 1, in one embodiment, a lighting unit 100 is shown installed in a hanging socket 106. Lighting unit 100 may include a housing 102 mounted on a base 104. Base 104 may be adapted to be, and in this case is, installed in a socket 106 that is mounted on ceiling 107. Lighting unit 100 may include one or more light sources 108. Light sources 108 may come in various forms, including but not limited to one or more LEDs, one or more incandescent light sources, one or more fluorescent light sources, and so forth. Light sources 108 may be configured to emit light at least in a first direction as indicated by the arrow A.

One or more at least partially reflective elements 110 may be disposed on or within lighting unit 100. One or more reflective elements 110 may be arranged and/or shaped to define an aperture 112 through which a first spatial portion 114 of the emitted light continues in the first direction A. One or more reflective elements 110 may also be arranged and/or shaped to prevent a second spatial portion 116 of the emitted light from continuing in the first direction A. Additionally or alternatively, one or more reflective elements 110 may be configured to reflect at least part of second spatial portion 116 of the emitted light in a second direction, B. In various embodiments, an angle between first direction A and second direction B may be greater than ninety degrees. In this example, second spatial portion 116 is reflected towards ceiling 107.

In this example, first spatial portion 114 of light emitted by one or more light sources 108 may travel downwards through a bottom of housing 102. If housing 102 is transparent, then that light would pass relatively unaltered through housing 102 as a beam. However, in this example, housing 102 is translucent or otherwise configured to diffuse light. Accordingly, first spatial portion 114 of emitted light is diffused by housing 102 to create a more diffuse light effect below lighting unit 100, as indicated by the arrows.

Figure 2:
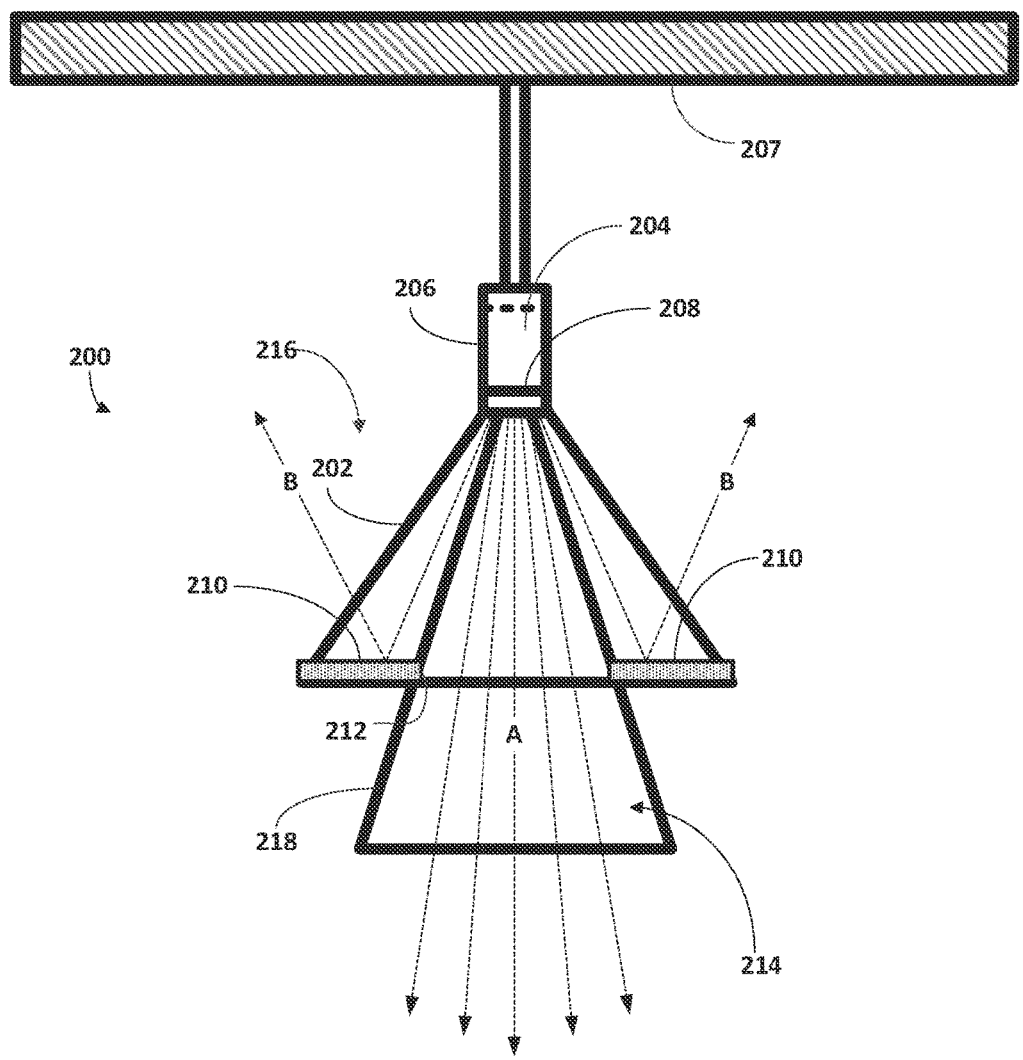
FIG. 2 illustrates another embodiment of a lighting unit configured with selected aspects of the present disclosure, in accordance with various embodiments.

FIG. 2 depicts another example lighting unit 200 in accordance with various embodiments. The embodiment of FIG. 2 is similar to that of FIG. 1 in many respects. However, lighting unit 200 includes an additional optical element in the form of a light guide 218 that is configured to guide a first spatial portion 214 of light emitted by one or more light sources 208 downwards in the direction A, e.g. as a beam of light rather than diffuse light. Housing 202 is shaped differently than housing 102 of FIG. 1. That may result in second spatial portion 216 of the light emitted by one or more light sources 208, which again travels in direct B which is different than direction A, behaving differently than second spatial portion 116 of light emitted by one or more light sources 108 of lighting unit 100 in FIG. 1. Thus, for instance, light cast on ceiling 207 by lighting unit 200 may appear differently than light cast on ceiling 107 by lighting unit 100.

Figure 3:
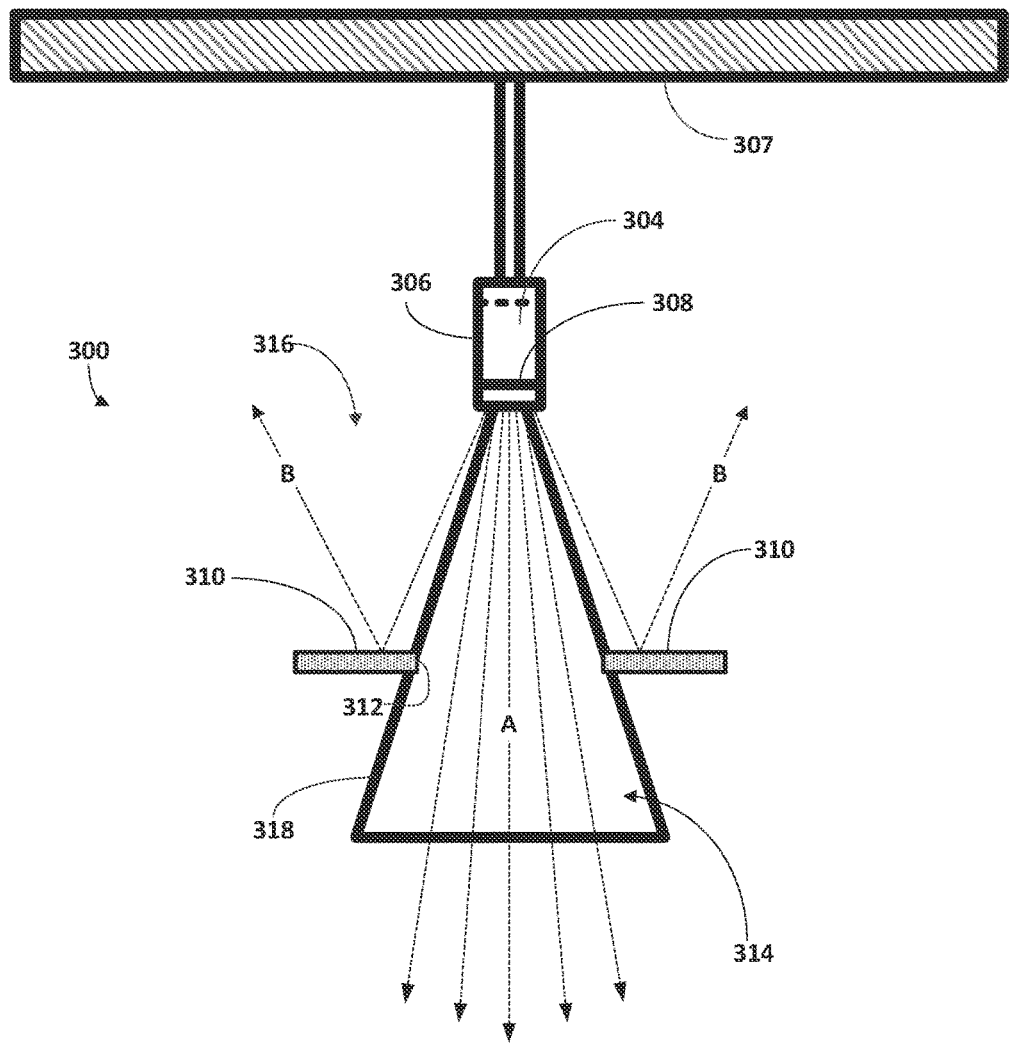
FIG. 3 illustrates another embodiment of a lighting unit configured with selected aspects of the present disclosure, in accordance with various embodiments.

FIG. 3 depicts another example lighting unit 300 in accordance with various embodiments. The embodiment of FIG. 3 is similar to those of FIGS. 1 and 2 in many respects. However, in FIG. 3, there is no housing (e.g., such as 102 or 202 in FIGS. 1 and 2, respectively) outside of one or more reflective elements 310. Accordingly, while a first spatial portion 314 of light emitted by one or more light sources 308 travels down a light guide 318, similar to FIG. 2, a second spatial portion 316 of light emitted by one or more light sources 308 is emitted uncontained by any housing.

As before, second spatial portion 316 of the emitted light is reflected from a top surface of one or more reflective elements 310 to travel in a second direction B. However, now a user may have easy access to the top surface of one or more reflective elements 310. This may enable the user to mount various optical elements on the top surface to cause second spatial portion 316 of light to exhibit various different lighting behaviors. For example, in some embodiments, a user may coat what may be an otherwise mirrored top surface with one or more phosphor materials. These materials may be selected to cause at least part of second spatial portion 316 of the emitted light to have a different characteristic (e.g., color temperature, hue, saturation, brightness, etc.) than first spatial portion 314 of the emitted light. In various embodiments, phosphor materials may be place on other portions of lighting units configured with selected aspects of the present disclosure.

For example, and referring to FIGS. 1 and 2, a portion of an inner or outer surface of housing (e.g., 102, 202) between a top surface of one or more reflective elements (e.g., 110, 210) and one or more light sources (e.g., 108, 208) may be coated with a phosphor material. This may cause second spatial portion (e.g., 116, 216) of light to have a different lighting property, such as color temperature, hue, etc., after it leaves housing (e.g., 102, 202). Phosphor materials may be placed elsewhere as well, such as on a bottom surface of housing 102 to alter a characteristic of light cast downwards.

Referring back to FIG. 3, in some embodiments, one or more reflective elements 310 may include a Lambertian surface. This surface may be integral with one or more reflective elements 310 or may be added by a user. As yet another example, a gobo (not depicted) may be mounted on or form part of one or more reflective elements 310. A gobo may permit a third spatial portion (not depicted) of the light emitted by one or more light sources 308 to pass through one or more reflective elements 310, e.g., to project various patterns and/or shapes. In embodiments, where lighting units are pointed upwards, instead of downwards as depicted in FIGS. 1-3, those patterns and/or shapes may be projected on a ceiling.

Figure 4A:
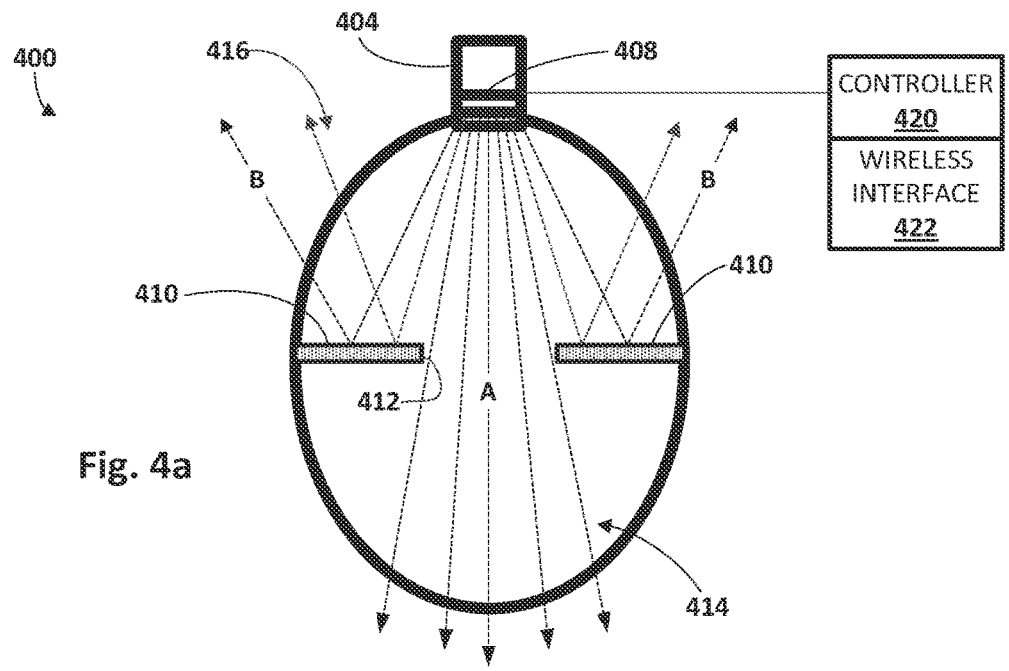
FIGS. 4a and 4b depict another embodiment of a lighting unit configured with selected aspects of the present disclosure, including an ability to alter a distance between one or more light sources and one or more reflective elements, in accordance with various embodiments.
Figure 4B:
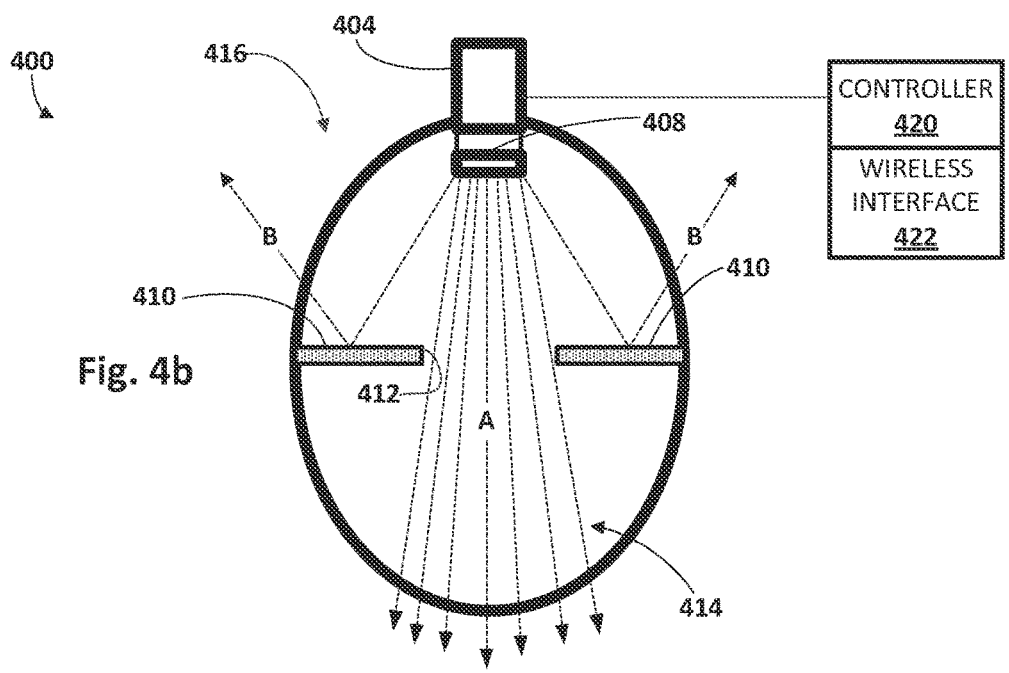

In various embodiments, one or more reflective elements and/or one or more light sources may be movable relative to each other. This may enable variations in light emitted by a lighting unit, particularly between various spatial portions of that emitted light. Referring to FIGS. 4a and 4b, a lighting unit 400 with components similar to those in FIGS. 1 and 2 is depicted. However, in FIGS. 4a and 4b, one or more light sources 408 are movable relative to one or more reflective elements 410.

For instance, in FIG. 4a, one or more light sources 408 are positioned near a bottom opening of base 404. Light emitted by one or more light sources 408 is divided, as before, between a first spatial portion 414 that passes through aperture 412 in a first direction A and a second spatial portion 416 that is reflected off a top surface of one or more reflective elements 410 in a second direction B. First spatial portion 414 may include slightly more light (as indicated by five total arrows) than second spatial portion 416 of light (as indicated by four total arrows), e.g., due to the relative placement of one or more light sources 408 and one or more reflective elements 410.

In FIG. 4b, one or more light sources 408 have been moved downwards along an axis that extends parallel to the first direction A through aperture 412. This may close a distance between one or more light sources 408 and one or more reflective elements 410, which in turn may alter a size or ratio of first spatial portion 414 of the emitted light as compared to second 416. In particular, relatively more light now passes through aperture 412 in first direction A, as indicated by the seven arrows forming first spatial portion 414. In contrast, relatively less light is reflected from one or more reflective elements 410, as indicated by the two arrows forming second spatial portion 416.

In some embodiments, one or more light sources 408 (and/or one or more reflective elements 410) may be moved relative to one another in various ways. In FIGS. 4a and 4b, for example, a controller 420 is schematically depicted coupled with lighting unit 400. Controller 420 may be configured to control various operational aspects of lighting unit 400, such as one or more properties of light emitted by one or more light sources 408 (particularly when light sources 408 are LEDs capable of emitting different colors temperatures, hues, saturations, etc.). Additionally, controller 420 may control various mechanical mechanisms (e.g., a motor, a solenoid, one or more springs, magnets, telescoping portion, etc.) to alter a distance between one or more light sources 408 and/or one or more reflective elements 410.

In some embodiments, controller 420 may include a wireless interface 422. Wireless interface 422 may be configured to exchange data over various wireless mediums using various technologies, such as Bluetooth, Wi-Fi, near field communication, coded light, ZigBee, and so forth. In various embodiments, user input including lighting control instructions and/or various other instructions may be received at wireless interface 422 and interpreted by controller 420 to cause lighting unit 400 to emit light having various properties (e.g., due to selective energizing of one or more light sources 408 and/or moving one or more light sources 408 and/or reflective elements 410 relative to one another). Thus, for instance, a user may control light output of lighting unit 400 with a mobile computing device such as a smart phone, tablet computer, wearable computing device (e.g., smart watch, smart glasses), and so forth.

The embodiments depicted in FIGS. 1-4 are depicted installed on ceilings so that first spatial portion (114, 214, 314, 414) of emitted light is cast downwards and second spatial portion (116, 216, 316, 416) is cast generally upwards. However, this is not meant to be limiting. As noted above, lighting units described herein may be installed so that various spatial portions of light emitted by one or more light sources (108, 208, 308, 408) are cast in other directions.

Figure 5:
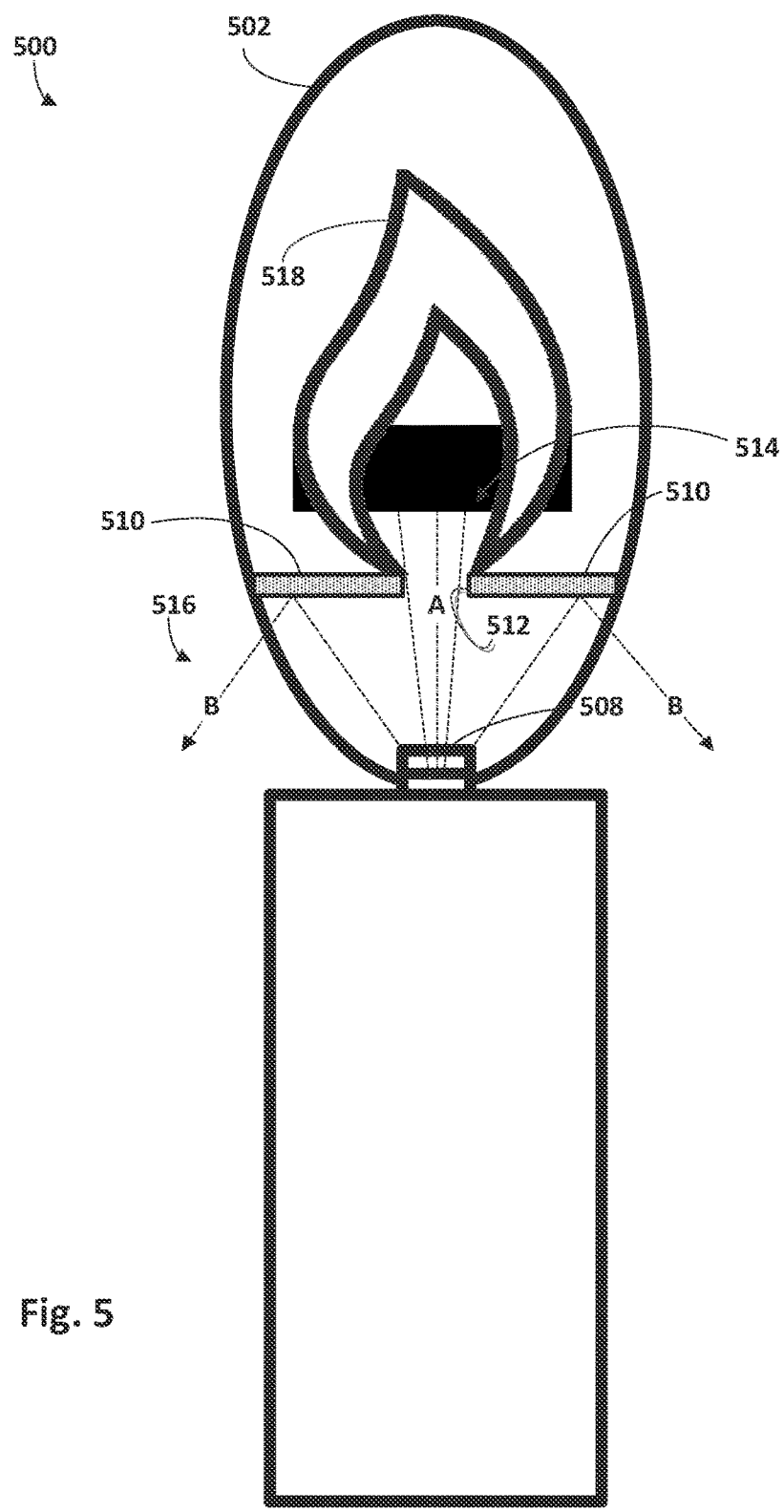
FIG. 5 illustrates another embodiment of a lighting unit configured with selected aspects of the present disclosure, including a light guide in the shape of a flame, in accordance with various embodiments.

For example, in FIG. 5, a lighting unit 500 is arranged so that a first spatial portion 514 of light emitted by one or more light sources 508 is cast upwards. A second spatial portion 516 of the emitted light is reflected downwards from one or more reflective elements 510. In this embodiment, a light guide 518 is formed in the shape of a flame and is placed on an opposite side of aperture 512 from one or more light sources 508. Lighting unit 500 may further include a controller (not depicted in FIG. 5, see, e.g., FIG. 4) configured to energize the one or more light sources 508 in a manner selected to mimic or resemble a flickering flame. Lighting unit 500 may be suitable, for instance, use as one of a plurality of lighting units installed in a chandelier.

One or more reflective elements (e.g., 110, 210, 310, 410, 510) may come in various forms. In some embodiments, one or more reflective elements may include a generally planar portion that can, for instance, be disk-shaped. Such a disk may, in various embodiments, be mounted on an inner or outer surface of a housing (e.g., 102, 202, 402, 502). As noted above, such a disk may define aperture (e.g., 112, 212, 312, 412, 512), e.g., through its middle. In some embodiments, the disk may be controllable to alter a size of the aperture. Altering a size of the aperture may dictate how much light emitted by one or more light sources (108, 208, 308, 408, 508) passes through as a first spatial portion (e.g., 114, 214, 314, 414, 514), as opposed to how much of the emitted light is redirected as a second spatial portion (e.g., 116, 216, 316, 416, 516). In various embodiments, a first surface of such a disk that faces one or more light sources may be least partially reflective.

Figure 6A:
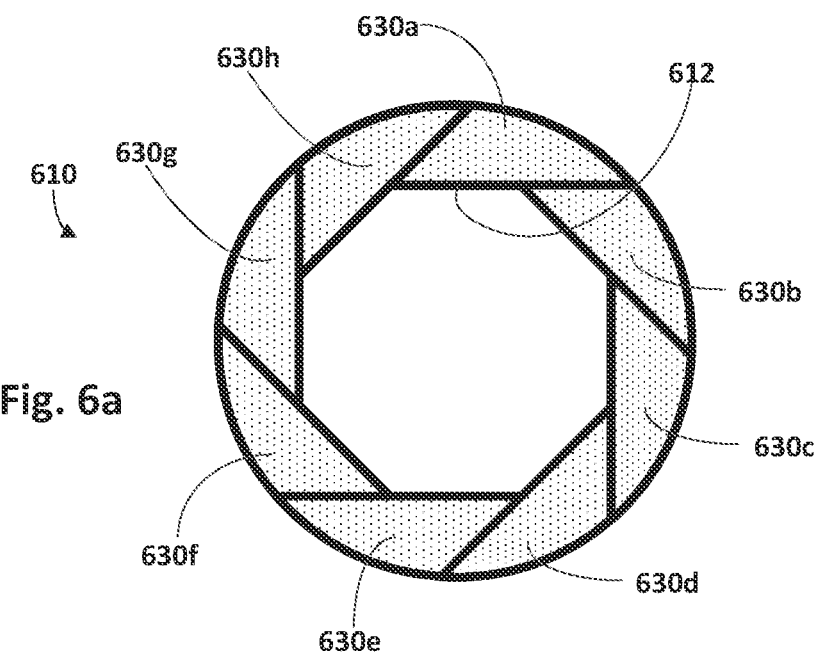
FIG. 6 depicts an example of one or more reflective elements in the form of a diaphragm shutter, in accordance with various embodiments.
Figure 6B:
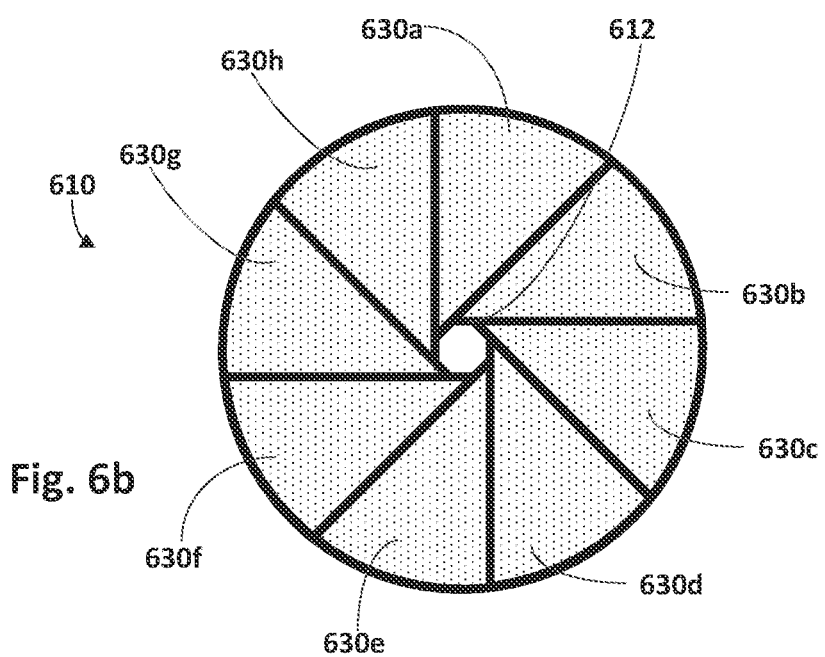

A size of an aperture through one or more reflective elements may be altered by a disk in various ways. One example mechanism is depicted in FIGS. 6a and 6b. One or more reflective elements 610 includes a plurality of reflective blades 630a-h that collectively form a diaphragm shutter. In various embodiments, the plurality of reflective blades 630a-h may be configured to be slid over each other to alter a diameter of aperture 612. For example, in FIG. 6a, plurality of reflective blades 630a-h are positioned so that aperture 612 is relatively large. In FIG. 6b, in contrast, plurality of reflective blades 630a-h have been slid over each other so that aperture 612 is relatively small, in turn permitting only a small first spatial portion (e.g., 114, 214, 314, 414, 514) of emitted light to pass through. Similar to above, in various embodiments, the diaphragm shutter formed by blades 630a-h may be controllable via user input received at a controller (not depicted in FIG. 6) through a wireless interface (also not depicted in FIG. 6).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting unit, comprising:
   a base adapted to be inserted into a socket of a luminaire or lighting fixture;
   one or more light sources to emit light at least in a first direction; and
   one or more reflective elements arranged to:
      define-an aperture through which a first spatial portion of the emitted light continues in the first direction;
      prevent a second spatial portion of the emitted light from continuing in the first direction; and
      reflect at least part of the second spatial portion of the light in a second direction that is different than the first direction;
   wherein the one or more reflective elements comprise a plurality of reflective blades of a diaphragm shutter, wherein the plurality of reflective blades is configured to be slid over each other to alter a diameter of the aperture.

2. The lighting unit of claim 1, wherein the one or more reflective elements are movable relative to the one or more light sources.

3. The lighting unit of claim 1, wherein the one or more light sources are movable relative to the one or more reflective elements.

4. The lighting unit of claim 3, further comprising a controller configured to cause the one or more light sources to move in response to user input.

5. The lighting unit of claim 4, wherein the controller is configured to receive the user input over a wireless interface.

6. The lighting unit of claim 3, wherein the one or more light sources are movable along an axis that extends parallel to the first direction through the aperture to alter a size of the first spatial portion of the emitted light.

7. The lighting unit of claim 1, wherein the one or more reflective elements include a mirrored surface.

8. The lighting unit of claim 1, wherein at least part of the one or more reflective elements is coated with a phosphor material selected to cause at least part of the second spatial portion of light to have a different color temperature than the first spatial portion of light.

9. The lighting unit of claim 1, wherein the one or more reflective elements include a Lambertian surface.

10. The lighting unit of claim 1, further comprising a light guide mounted over the aperture to receive the first spatial portion of the light.

11. The lighting unit of claim 10, wherein the light guide is shaped to resemble a flame, and the lighting unit further comprises a controller configured to energize the one or more light sources in a manner selected to mimic a flickering flame.

12. The lighting unit of claim 1, wherein the one or more reflective elements comprise a disk with a surface that faces the light sources, wherein the surface is at least partially reflective, wherein the aperture passes through the disk.

13. The lighting unit of claim 12, further comprising a transparent or translucent housing coupled to the base, wherein the disk is mounted on a surface of the housing.

14. The lighting unit of claim 13, wherein at least a portion of a surface of the housing is coated with phosphor material.

15. The lighting unit of claim 14, wherein at least a portion of the surface of the housing between the surface of the disk and the one or more light sources is coated with phosphor material.

16. The lighting unit of claim 1, wherein the diaphragm shutter is controllable via user input received through a wireless interface.

17. A lighting unit comprising:
   a base adapted to be inserted into a socket of a luminaire or lighting fixture;
   one or more LEDs to emit light;
   a controller configured to selectively energize the one or more LEDs in response to user input;
   a planar portion with an at least partially reflective surface that faces the light sources, wherein the planar portion defines an aperture through which at least a first spatial portion of the emitted light emitted passes, while a second spatial portion of the emitted light is reflected off the at least partially reflective surface;
   wherein the planar portion comprises a plurality of reflective blades of a diaphragm shutter, wherein the plurality of reflective blades is configured to be slid over each other to alter a diameter of the aperture.

18. The lighting unit of claim 17, wherein the controller is configured to alter a distance between the planar portion and the one or more LEDs in response to user input.

19. The lighting unit of claim 17, wherein the controller is configured to cause the planar portion to alter a diameter of the aperture in response to user input.

20. The lighting unit of claim 17, wherein the at least partially reflective surface is at least partially coated with a phosphor material, so that light reflected from the at least partially reflected surface has a different color temperature than light emitted by the one or more LEDs.

* * * * *